United States Patent [19]

Krueger

[11] 4,333,850

[45] Jun. 8, 1982

[54] FILLED POLYMER COMPOSITION FOR AUTOMATIC ADDITION OF A CORROSION INHIBITOR TO A COOLANT SYSTEM

[75] Inventor: Robert H. Krueger, Palatine, Ill.

[73] Assignee: Borg-Warner Corporation, Chicago, Ill.

[21] Appl. No.: 49,005

[22] Filed: Jun. 15, 1979

[51] Int. Cl.³ ...................... C23F 11/16; C23F 11/18; F01P 3/00

[52] U.S. Cl. .............................. 252/389 A; 123/41.42; 252/74; 252/76; 252/389 R; 264/49; 422/18

[58] Field of Search ................. 252/389 A, 389 R, 74, 252/76; 422/18; 123/41.42; 264/49

[56] References Cited

U.S. PATENT DOCUMENTS

| | | | |
|---|---|---|---|
| 2,792,345 | 5/1957 | Hulsebosch et al. ............... | 252/387 |
| 3,476,844 | 11/1969 | Villain .................................. | 264/49 |
| 3,533,942 | 10/1970 | Rhees et al. ......................... | 252/8.8 |
| 3,755,517 | 8/1973 | Clancy et al. ....................... | 264/41 |
| 3,923,939 | 12/1975 | Baker et al. ......................... | 264/49 |
| 3,992,496 | 11/1976 | Matsunaga et al. ................. | 264/49 |
| 4,051,066 | 9/1977 | Miksic et al. ................... | 252/389 R |

Primary Examiner—Benjamin R. Padgett
Assistant Examiner—Irwin Gluck
Attorney, Agent, or Firm—James A. Geppert

[57] ABSTRACT

A filled insoluble polymer containing one or more corrosion inhibitors and a slightly water soluble polymer is utilized to automatically and continuously add a corrosion inhibitor to a coolant solution passing through a heat exchanger. The corrosion inhibitor is gradually leached from the filled polymer supplying inhibitor to the coolant to protect the metallic parts of the coolant system that are subject to corrosive conditions.

12 Claims, No Drawings

FILLED POLYMER COMPOSITION FOR AUTOMATIC ADDITION OF A CORROSION INHIBITOR TO A COOLANT SYSTEM

BACKGROUND OF THE INVENTION

Engine coolants for the cooling system of automotive vehicles usually contain ethylene glycol with a small percentage of diethylene glycol diluted with water to provide a 50% or lower concentration of glycol depending on the desired freezing point for the coolant system. Most companies that manufacture and/or distribute ethylene glycol for coolant systems add corrosion inhibitors to the solution to prevent corrosion of the copper-brass material traditionally used in the manufacture of vehicle radiators.

These inhibitors usually are a mixture of one or more inorganic salts, such as phosphates, borates, nitrates, nitrites, silicates and/or arsenates, along with an organic compound, such as benzotriazole, tolyltriazole or mercaptobenzothiazole, to prevent copper corrosion. The solution is generally buffered to a pH in the range of 8-10 to reduce iron corrosion and to neutralize any glycolic acid formed in the oxidation of ethylene glycol. Most companies recommend only one or two years' service for their antifreeze coolant, however, the average car owner does not follow the owner's instruction manual to maintain $-20°$ F. protection for the coolant system and does not periodically check the coolant to determine if it is rusty or dirty. Vehicle owners will normally only add water where the antifreeze coolant is lost through leakage, hose breakage or overheating due to mechanical problems.

In normal passenger car service, 25% of the cars require coolant system servicing after one year and, after two years, this percentage rises to 50%. With a copper-brass radiator, it is extremely important that the coolant mixture contain 50-55% of the properly inhibited ethylene glycol. A reduction of 33% ethylene glycol and 67% water with a corresponding reduction in the inhibitor level will increase metal corrosion significantly. This is especially important in high temperature coolant systems which are becoming more common in view of the increased use of emission controls. Also, the corrosion inhibitor may lose its effectiveness with age and its use in a coolant system will result in an increase in corrosion of the metallic parts of the coolant system.

With the increasing emphasis on gas mileage of automobiles, cars are being downsized and reduced in weight by the substitution of lightweight metals or plastic for the traditional materials. In the coolant system, aluminum radiators are being substituted for previously used copper-brass radiators, and aluminum is more susceptible to the corrosive action of a coolant that is low in the percentage of ethylene glycol and/or corrosion inhibitor. In such a system, additional corrosion inhibitor must be added or the aluminum will begin to corrode by pitting at a rapid rate. The present invention overcomes this corrosion problem by providing for a substantially continuous automatic additon of corrosion inhibitor to the coolant.

SUMMARY OF THE INVENTION

The present invention relates to composition and device to automatically and continuously add a suitable corrosion inhibitor to a coolant solution in a cooling system for an automotive vehicle engine or other system utilizing a coolant circulating through a heat exchanger. The composition is a filled polymer containing one or more corrosion inhibitors for the metals commonly found in the coolant system. The composition in a suitable form is inserted into or incorporated as an integral part of the coolant system to be exposed to the circulating coolant so that the corrosion inhibitor would be leached out of the polymer into the coolant.

The present invention also comprehends the provision of a filled polymer including a suitable insoluble polymer material, a slightly water soluble polymer and a corrosion inhibitor. The components in powder form are ball milled and then compression molded to a suitable shape to be inserted into the coolant system. The slightly water soluble polymer prevents encapsulation of the corrosion inhibitor and slows solubility thereof.

Other objects and advantages of the invention will be apparent from the following detailed description of the preferred embodiments thereof.

DESCRIPTION OF THE PREFERRED EMBODIMENTS

The present invention relates to a composition and method of automatically and continuously adding a corrosion inhibitor to a coolant solution for a coolant system having a heat exchanger therein; more specifically, an automobile engine coolant system with a radiator formed of a material that is subject to corrosion under corrosive conditions of the coolant solution due to the loss of ethylene glycol and inhibitor or to the loss of effectiveness of the inhibitor.

One suitable insoluble polymer for the filled polymeric composition is polypropylene, available as a fine powder, which was mixed with a slightly water soluble or water penetrable polymer, such as polyvinyl alcohol, and a corrosion inhibitor; ball milled for thirty minutes; and then compression molded at a temperature in the range of 400° to 450° F. for four minutes to form a plaque. Lithium phosphate ($Li_3PO_4$) was chosen as the corrosion inhibitor because of its slow solubility in water and because phosphate has good corrosion inhibitor characteristics. For the slightly water soluble or water penetrable polymer, polyoxyethylene or a cellulose acetate could be substituted for the polyvinyl alcohol; the function of the slightly water soluble polymer being to slow the solubility of the inhibitor and to prevent encapsulation of the inorganic salt, lithium phosphate, by the insoluble polypropylene.

After the filled polymer plaques were formed, they were cut into strips and exposed to water or ethylene glycol solution to determine the amount of the corrosion inhibitor extracted as a function of time and temperature. Table I indicates the results of filled polymer strips in water at room temperature where the lithium phosphate gradually dissolved reaching a maximum solubility of approximately 400 parts per million after 48 days. After 105 days the water was replaced with new deionized water and the test continued. Analysis over the period of 112 to 150 days indicated that a filled polymer strip composed of 62.5% polypropylene, 25% lithium phosphate and 12.5% polyoxyethylene (test No. 73-15-3A) gave the greatest lithium phosphate solubility. At 160 days, the water was again changed, and the test continued for 362 days before replacing the water. At 369 days, the specimen was weighed showing a 17.8% weight loss. Assuming lithium phosphate and polyoxyethylene dissolve at rates equivalent to their initial concentration, then approximately one-half of the inhibitor is still available. After 537 days, the specimen showed an 18.7% weight loss and, after 675 days, the specimen showed a 19.1% weight loss.

the specimen composed of 62.5% of polypropylene, 25% lithium phosphate and 12.5% polyoxyethylene showed the greatest solubility by weight loss.

TABLE I

| Composition 73 | 9 | 15 - 5A* | 22 - 1* | 15 - 1A | 15 - 2A | 15 - 3A | 8 - 4A* | 8 - 3A* | 22 - 2 |
|---|---|---|---|---|---|---|---|---|---|
| % $Li_3PO_4$ | 100 | 25 | 25 | 25 | 25 | 25 | 25 | 25 | 25 |
| % Polypropylene | — | 50 | 50 | 62.5 | 62.5 | 62.5 | 75 | 75 | — |
| % Cellulose Acetate | — | 25 | 25 | 12.5 | — | — | — | — | 75 |
| % Polyvinyl Alcohol | — | — | — | — | 12.5 | — | — | — | — |
| % Polyoxy-ethylene | — | — | — | — | — | 12.5 | — | — | — |
| Time (days) | ← | ← | | Litium Phosphate Analysis (PPM) | | | → | → | |
| 1 | 59 | — | — | — | — | — | 28 | 22 | — |
| 2 | — | — | — | 70 | 46 | 70 | — | — | — |
| 4 | — | 131 | — | — | — | — | — | — | — |
| 5 | — | — | — | 86 | 73 | 131 | — | — | — |
| 7 | — | — | 39 | — | — | — | — | — | 18 |
| 12 | 173 | 173 | — | 116 | 109 | 209 | 122 | 65 | — |
| 15 | — | — | 72 | — | — | — | — | — | 22 |
| 19 | 221 | 224 | — | 167 | 161 | 206 | 150 | 81 | — |
| 26 | 262 | 278 | — | — | — | — | 156 | 80 | — |
| 29 | — | — | 121 | — | — | — | — | — | 26 |
| 34 | 339 | — | — | 230 | 247 | 247 | 206 | 106 | — |
| 40 | — | 350 | — | — | — | — | — | — | — |
| 48 | 420 | 304 | 127 | 221 | 254 | 254 | 193 | 79 | 22 |
| 64 | 436 | — | 125 | 223 | 275 | 330 | 221 | 105 | — |
| 74 | — | 330 | — | — | — | — | — | — | — |
| 85 | 390 | 468 | — | 329 | 411 | 363 | 240 | 92 | — |
| 105 | 377 | — | — | — | — | — | 380 | 150 | — |
| pH | 10.0 | 8.5 | — | 10.2 | 10.0 | 10.3 | 9.1 | 9.4 | — |
| | ← | ← | ← | Replaced water | | → | → | → | → |
| 112 | 221 | 36 | 12.5 | 15 | 21 | 193 | 53 | 1.9 | — |

| | Composition 73 | 9 | 15 - 1A | 15 - 2A | 15 - 3A | 15 - 5A* |
|---|---|---|---|---|---|---|
| | % $Li_3PO_4$ | 100 | 25 | 25 | 25 | 25 |
| | % Polypropylene | — | 62.5 | 62.5 | 62.5 | 50 |
| | % Cellulose Acetate | — | 12.5 | — | — | 25 |
| | % Polyvinyl Alcohol | — | — | 12.5 | — | — |
| | % Polyoxy-ethylene | — | — | — | 12.5 | — |
| | Time (days) | | Lithium Phosphate Analysis (PPM) | | | |
| | 112 | 221 | 15 | 21 | 193 | 36 |
| | 126 | 220 | 25 | 30 | 171 | 66 |
| | 141 | 253 | 29 | 40 | 207 | 78 |
| | 150 | 384 | 44 | 78 | 311 | 147 |
| | 160 | ← | Replace water | | → | → |
| | 170 | 12 | 1 | 1 | 14 | 3 |
| | 175 | 12 | 1 | 2 | 16 | 4 |
| | 180 | ← | Stop Test | → | — | Stop Test |
| | 189 | — | — | — | 22 | — |
| | 202 | — | — | — | 166 | — |
| | 228 | — | — | — | 280 | — |
| | 362 | — | — | — | 461 | — |
| | 362 | — | — | — | Replace water | — |
| | 367 | | | | 6 | |
| | % Specimen Weight Loss after 370 days | — | — | — | 17.8 | — |
| | % Specimen Weight Loss after 537 days | — | — | — | 18.7 | — |
| | % Specimen Weight Loss after 675 days | — | — | — | 19.1 | — |

*Note
15 - 5A Ball milled
22 - 1 Roll milled
8 - 4A Not milled
8 - 3A Ball milled A similar extraction test was run in a 50—50 solution of Prestone II and water at room temperature. The results of this test are shown in Table II. During this test, the specimens were taken out after 42 days, placed in 100% water and the test continued for 253 days. Then the specimens were dried and weighed. Again,

TABLE II

| Composition 73 | 54 - 1 | 54 - 2 | 54 - 3 | 54 - 4 | 54 - 5 | 54 - 6 |
|---|---|---|---|---|---|---|
| % $Li_3PO_4$ | 100 | 25 | 25 | 25 | 25 | 15 |
| % Polypropylene | — | 50 | 62.5 | 62.5 | 62.5 | 30 |
| % Cellulose Acetate | — | 25 | 12.5 | — | — | 55 |
| % Polyvinyl Alcohol | — | — | — | 12.5 | — | — |
| % Polyoxyethylene | — | — | — | — | 12.5 | — |
| Time (Days) | Lithium Phosphate Analysis (PPM) | | | | | |
| 5 | 55 | 137 | 110 | 83 | 111 | 133 |
| 12 | 119 | 168 | 141 | 114 | 141 | 162 |
| 19 | 176 | 220 | 164 | 156 | 202 | 245 |
| 26 | 219 | 266 | 196 | 196 | 237 | 305 |
| 42 | 226 | 286 | 224 | 191 | 146 | 312 |
| 42 | ← Take all samples out and let dry → | | | | | Stop Test |
| 55 | ← Put all samples in water → | | | | | |
| 56 | 14 | 6 | 3 | 2 | 7 | — |
| 66 | 29 | 27 | 21 | 27 | 30 | — |
| 98 | 247 | 247 | 163 | 169 | 228 | — |
| 112 | 348 | 371 | 264 | 359 | 289 | — |
| 246 | 406 | 745 | 411 | 550 | 539 | — |
| 246 | ← Replace water → → | | | | | |
| 251 | 21 | 3 | 1 | 11 | 22 | |
| % Specimen Weight Loss after 253 days | — | 13.6 | 5.4 | 4.2 | 20.0 | |
| % Specimen Weight Loss after 420 days | — | 15.0 | 5.8 | 6.1 | 25.8 | |
| % Specimen Weight Loss after 608 days | — | 17.1 | 6.9 | 7.1 | 28.3 | |

Some of the data from Tables I and II has been tabulated in Table III to compare the extraction rates in water with that in Prestone II.

From Tables I, II and III, it can be concluded that at room temperature lithium phosphate gradually leaches from filled polypropylene plastics containing water soluble or penetrable polymers; this continuing over more than a one year period with water replaced three times (test No. 73-15-3A). Lithium phosphate is also extracted from a 50—50 Prestone II-water mixture, but at a slightly slower rate. Also, approximately 50% of the filler of lithium phosphate-polyoxyethylene is extracted in approximately one year's time.

Extraction tests were also run in refluxing solution simulating actual use in an automobile radiator. The extraction tests in water at 100° C. are shown in Table IV and in a 50—50 solution of Prestone II and water at 107° C. are shown in Table V.

TABLE III

| Composition: | 1 | 2 | 3 | 4 | 5 |
|---|---|---|---|---|---|
| % $Li_3PO_4$ | 100 | 25 | 25 | 25 | 25 |
| % Polypropylene | — | 50 | 62.5 | 62.5 | 62.5 |
| % Cellulose Acetate | — | 25 | 12.5 | — | — |
| % Polyvinyl Alcohol | — | — | — | 12.5 | — |
| % Polyoxyethylene | — | — | — | — | 12.5 |

| | Lithium Phosphate Analysis (PPM) | | | | | | | | | |
|---|---|---|---|---|---|---|---|---|---|---|
| Time (days) | $H_2O$ | 50% Prestone 50% $H_2O$ | $H_2O$ | 50% Prestone 50% $H_2O$ | $H_2O$ | 50% Prestone 50% $H_2O$ | $H_2O$ | 50% Prestone 50% $H_2O$ | $H_2O$ | 50% Prestone 50% $H_2O$ |
| 1 | 59 | — | — | — | — | — | — | — | — | — |
| 5 | — | 55 | 131 | 137 | 86 | 110 | 73 | 83 | 131 | 111 |
| 12 | 173 | 119 | 173 | 168 | 116 | 141 | 109 | 114 | 209 | 141 |
| 19 | 221 | 176 | 224 | 220 | 167 | 164 | 161 | 156 | 206 | 202 |
| 27 | 262 | 219 | 278 | 266 | — | 196 | — | 196 | — | 237 |
| 48–42 | 420 | 226 | 350 | 286 | 221 | 224 | 254 | 191 | 254 | 146 |

TABLE IV

| Composition 73 | 15 - 6 | 15 - 5B | 15 - 1B | 15 - 2B | 15 - 3B | 8 - 4B* | 8 - 3B* | 15 - 4B* |
|---|---|---|---|---|---|---|---|---|
| % $Li_3PO_4$ | 100 | 25 | 25 | 25 | 25 | 25 | 25 | 25 |
| % Polypropylene | — | 50 | 62.5 | 62.5 | 62.5 | 75 | 75 | 75 |
| % Cellulose Acetate | — | 25 | 12.5 | — | — | — | — | — |
| % Polyvinyl Alcohol | — | — | — | 12.5 | — | — | — | — |
| % Polyoxyethylene | — | — | — | — | 12.5 | — | — | — |
| Time (days) | Lithium Phosphate Analysis (PPM) | | | | | | | |
| 1 | — | — | — | — | — | 160 | 50 | — |
| 2 | 363 | — | 138 | 228 | 216 | 182 | 69 | 76 |
| | | | | | | ←Replace water→ | | |
| 4 | — | 448 New water | — | — | — | — | — | — |
| 5 | 400 | — | 221 | 284 | 294 | 84 | 11 | 128 |
| | | | | | | ←Replace water→ | | |
| 12 | 481 | 395 | 329 | 329 | 358 | 62 | 16 | 211 |
| 20 | 483 | 766 | 517 | 578 | 334 | — | — | 261 |

TABLE IV-continued

|  | New water |  | ← Replace water → |  |  |  |  | New water |
|---|---|---|---|---|---|---|---|---|
| 26 | — | 1180 | — | — | — | — | — | — |
|  | — | New water | — | — | — | — | — | — |
| 34 | 607 | — | 121 | 320 | 325 | — | — | 82 |
| 40 | — | 411 | — | — | — | — | — | — |
| 48 | 690 | — | 171 | 337 | 309 | — | — | 83 |
| 52 | New water |  | ← Replace water → |  |  | — | — | New water |
| 54 | — | 580 | — | — | — | — | — | — |
| 60 | — | New water | — | — | — | — | — | — |
| 66 | 298 | — | 39 | 223 | 200 | — | — | 6 |
| 74 | — | 83 | — | — | — | — | — | — |
| 89 | 418 | 258 | 117 | 409 | 369 | — | — | 12 |
| pH | 9.7 | 6.9 | 6.2 | 9.6 | 9.5 | — | — | 8.4 |
|  |  |  | ← Replace water → |  |  |  |  |  |
| 112 | 66 | 46 | 21 | 282 | 237 | — | — | 3.0 |

*Note:
8.- 4B Not ball milled
8 - 3B Ball milled
15 - 4B Ball milled

TABLE V

| Composition 73 | 55 - 1 | 55 - 2 | 55 - 3 | 55 - 4 | 55 - 5 | 55 - 6 |
|---|---|---|---|---|---|---|
| % $Li_3PO_4$ | 100 | 25 | 25 | 25 | 25 | 15 |
| % Polypropylene | — | 50 | 62.5 | 62.5 | 62.5 | 30 |
| % Cellulose Acetate | — | 25 | 12.5 | — | — | 55 |
| % Polyvinyl Alcohol | — | — | — | 12.5 | — | — |
| % Polyoxyethylene | — | — | — | — | 12.5 | 0 |
| Time (days) | Lithium Phosphate Analysis (PPM) | | | | | |
| 5 | 161 | 264 | 209 | 139 | 115 | 528 |
| 12 | 158 | 371 | 275 | 147 | 133 | 317 |
| 18 | 206 | 980 | 334 | 176 | 144 | 1032 |
| 18 | ← Solution replaced with new 50% Prestone II - 50% $H_2O$ → | | | | | |
| 26 | 213 | 194 | 99 | 193 | 153 | 151 |
| 42 | 228 | 228 | 201 | 177 | 141 | 235 |
| 42 | ←Take out all samples. Dry specimens and weigh.→ | | | | | Stop test |
| 55 | ←Place all specimens in $H_2O$ (100° C.)→ | | | | → | |
| 56 | 32 | 11 | 6 | 18 | 19 | — |
| 66 | 46 | 37 | 24 | 44 | 42 | — |
| 70 | 44 | 39 | 23 | 46 | 44 | — |
| 70 | | | Stop all Tests | | | |
| % Specimen Weight Loss after 42 days | | 5.7 | 2.9 | 4.4 | 5.2 | |

The data for both solutions are compared in Table VI.

TABLE VI

| Composition | 1 | 2 | 3 | 4 | 5 |
|---|---|---|---|---|---|
| % $Li_3PO_4$ | 100 | 25 | 25 | 25 | 25 |
| % Polypropylene | — | 50 | 62.5 | 62.5 | 62.5 |
| % Cellulose Acetate | — | 25 | 12.5 | — | — |
| % Polyvinyl alcohol | — | — | — | 12.5 | — |
| % Polyoxyethylene | — | — | — | — | 12.5 |

| | Lithium Phosphate Analysis (PPM) | | | | | | | | | |
|---|---|---|---|---|---|---|---|---|---|---|
| Time (days) | $H_2O$ | 50% Prestone 50% $H_2O$ | $H_2O$ | 50% Prestone 50% $H_2O$ | $H_2O$ | 50% Prestone 50% $H_2O$ | $H_2O$ | 50% Prestone 50% $H_2O$ | $H_2O$ | 50% Prestone 50% $H_2O$ |
| 5 | 400 | 161 | 448 | 264 | 221 | 209 | 284 | 139 | 294 | 115 |
| 12 | 481 | 158 | 395 | 371 | 329 | 275 | 329 | 147 | 358 | 133 |
| 20–18 | 483 | 206 | 766 | 480 | 517 | 334 | 578 | 176 | 334 | 144 |
| 20–18 | ← | ← Solution replaced with new $H_2O$ or Prestone II - $H_2O$ → | | | | | | | | → |
| 34–26 | 607 | 213 | — | 194 | 121 | 99 | 320 | 193 | 325 | 153 |
| 48–42 | 690 | 228 | — | 228 | 171 | 201 | 337 | 177 | 309 | 141 |

From these three tables, it can be concluded that, at boiling temperatures, lithium phosphate dissolves at a faster rate than at room temperature, except for the polypropylene, polyoxyethylene, lithium phosphate composition. This may result from the tendency of polyoxyethylene to gel or precipitate at boiling temperatures. Also, the rate of extraction of lithium phosphate is greater in water than in a 50—50 mixture of Prestone II and water.

In additional tests, the lithium phosphate was replaced by a more soluble commercially available corrosion inhibitor which was analyzed to be a mixture of sodium and/or potassium salts of nitrite, nitrate, borate and silicate. These tests as shown in Table VII showed very little difference in extraction rates in either water or a Prestone II-water mixture under room temperature or boiling temperature conditions.

TABLE VII

| Composition: 98 | 21-1 | 21-2 | 21-3 | 21-1W | 21-4 | 21-2W | 22-1 | 22-2 | 22-3 | 22-4 |
|---|---|---|---|---|---|---|---|---|---|---|
| % Inhibitor | 1 | 5 | 12.5 | 12.5 | 25 | 25 | 1.0 | 5.0 | 12.5 | 25 |
| % Polypropylene | 86.5 | 82.5 | 75 | 75 | 62.5 | 62.5 | 86.5 | 83.5 | 75 | 62.5 |
| % Polyoxyethylene | 12.5 | 12.5 | 12.5 | 12.5 | 12.5 | 12.5 | 12.5 | 12.5 | 12.5 | 12.5 |
| Solution | 50% Prestone 50% $H_2O$ | 50% Prestone 50% $H_2O$ | 50% Prestone 50% $H_2O$ | $H_2O$ | 50% Prestone 50% $H_2O$ | $H_2O$ | 50% Prestone 50% $H_2O$ | 50% Prestone 50% $H_2O$ | 50% Prestone 50% $H_2O$ | 50% Prestone 50% $H_2O$ |
| Temperature °C. | 107 | 107 | 107 | 100 | 107 | 100 | ← Room Temperature → | | | |
| Time (Days) | ← | ← | ← | ←Analysis for Sodium (PPM)→ | | | → | → | → | |
| 10 | 200 | 150 | 70 | 152 | 250 | 292 | 0 | 60 | 0 | 0 |
| 50 | 0 | 85 | 237 | 234 | 0 | 358 | 16 | 199 | 356 | 225 |
| 50 | | | Changed to Room Temperature | | | | — | — | — | — |
| 70 | 91 | 244 | 188 | 211 | 391 | 325 | 0 | 71 | 97 | 0 |
| 184 | 320 | 480 | 660 | 245 | 540 | 395 | 170 | 190 | 170 | 360 |
| 184 | ← | ← | ← | Solution changed to water in all tests | | | → | → | → | |
| 189 | 85 | 123 | 150 | 9 | 10 | 2 | 42 | 12 | 13 | 24 |
| % Specimen Weight Loss After 191 Days | 12.1 | 14.7 | 17.1 | 18.7 | 22.3 | 21.4 | 5.0 | 6.3 | 13.8 | 15.8 |
| % Specimen Weight Loss After 358 Days | 13.3 | 16.0 | 19.7 | 22.0 | 24.0 | 25.8 | 8.4 | 9.9 | 15.8 | 18.4 |
| % Specimen Weight Loss After 496 Days | 13.4 | 16.2 | 20.5 | 22.3 | 24.5 | 26.3 | 10.5 | 12.0 | 18.1 | 21.1 |

All of the filled polymers retained their integrity over the test periods. Other polymeric materials which may be utilized for this composition include the following insoluble thermoplastics: polyethylene, ABS, fluorocarbons, nylon, polyamides, polycarbonates, polyethylene oxide, polyesters, polyphenylene sulfide, polyphenyl sulfone, polysulfone, polystyrene, styrene acrylonitrile and polyvinyl choloride. Insoluble thermosetting materials include phenolics and epoxys. With respect to the slightly water soluble or water penetrable polymers, these can include natural materials, such as corn starch, dextrin, animal glue, gelatin and alginates, and synthetics falling into the catagories of cellulose derivatives, acrylates and miscellaneous. The cellulose derivatives include carboxymethyl cellulose, hydroxyethyl cellulose and carboxymethyl hydroxyethyl cellulose. The acrylates include polyacrylic acid salts and polyacrylamide, while the miscellaneous materials include polyvinyl alcohol, polyoxyethylene and polyvinyl pyrrolidone.

I claim:

1. A filled polymer composition for the automatic addition of a corrosion inhibitor to a coolant system, comprising an insoluble polymer, a slightly water soluble polymer and a soluble corrosion inhibitor, wherein powders of the three components are milled together and compression molded at an elevated temperature to form a solid member to be inserted in the circulating fluid of a coolant system, the corrosion inhibitor leaching out of the polymer to retain a proper level of corrosion inhibitor in the coolant.

2. A filled polymer composition as set forth in claim 1, in which said composition includes 50 to 62.5% of insoluble polymer, 12.5 to 25% of slightly soluble polymer, and 25% corrosion inhibitor.

3. A filled polymer composition as set forth in claim 1, in which the powders are compression molded at a temperature in the range of 400° to 450° F.

4. A filled polymer composition as set forth in claim 1, in which said slightly soluble polymer material acts to prevent encapsulation of the corrosion inhibitor particles by said insoluble polymeric material.

5. A filled polymer composition as set forth in claim 1, in which said slightly soluble polymer material slows the solubility of the water soluble corrosion inhibitor.

6. A filled polymer composition as set forth in claim 1, in which said slightly soluble polymer is selected from the group comprising polyvinyl alcohol, polyoxyethylene and cellulose acetate.

7. A filled polymer composition as set forth in claim 1, in which said insoluble polymer is polypropylene.

8. A method for the continuous addition of a water soluble corrosion inhibitor to a coolant system having a coolant consisting essentially of ethylene glycol and water, comprising the steps of forming a filled polymer material having an insoluble polymer material and a water soluble corrosion inhibitor therein, positioning the filled polymer material in the coolant system, and leaching the corrosion inhibitor from the filled polymer.

9. The method as set forth in claim 8, in which a slightly water soluble polymer is added in the formation of the filled polymer to prevent encapsulation of the corrosion inhibitor and slow the solubility thereof.

10. The method as set forth in claim 9, in which powders or particles of the insoluble polymer, slightly water soluble polymer and corrosion inhibitor are ball milled together and compression molded to form the filled polymer composition.

11. The method as set forth in claim 10, in which said composition includes 50 to 62.5% of insoluble polymer, 12.5 to 25% of slightly soluble polymer and 25% of corrosion inhibitor.

12. The method as set forth in claim 10, in which the milled material is compression molded at a temperature in the range of 400° to 450° F.

* * * * *